United States Patent
Ramachandran et al.

(10) Patent No.: US 8,989,742 B2
(45) Date of Patent: Mar. 24, 2015

(54) METHODS AND APPARATUS FOR INTER-RAT CELL RESELECTION

(75) Inventors: Shyamal Ramachandran, San Diego, CA (US); Thomas Klingenbrunn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/523,308

(22) Filed: Jun. 14, 2012

(65) Prior Publication Data

US 2012/0322447 A1 Dec. 20, 2012

Related U.S. Application Data

(60) Provisional application No. 61/498,471, filed on Jun. 17, 2011.

(51) Int. Cl.
*H04W 36/00* (2009.01)
*H04W 48/18* (2009.01)

(52) U.S. Cl.
CPC .................................. *H04W 48/18* (2013.01)
USPC ....................................................... 455/436

(58) Field of Classification Search
CPC ............................. H04W 84/00; H04W 28/00
USPC ........... 455/434, 436, 525, 443, 404.1, 435.3, 455/441; 370/332, 329, 328, 236.2, 252, 370/242
See application file for complete search history.

(56) References Cited

U.S. PATENT DOCUMENTS

| | | |
|---|---|---|
| 5,398,258 A | 3/1995 | Su et al. |
| 5,729,531 A | 3/1998 | Raith et al. |
| 5,761,623 A | 6/1998 | Lupien et al. |
| 6,016,428 A | 1/2000 | Diachina et al. |
| 6,108,524 A | 8/2000 | Hershey et al. |
| 6,259,915 B1 | 7/2001 | Raith |
| 6,304,756 B1 | 10/2001 | Hebeler et al. |
| 6,625,132 B1 | 9/2003 | Boettger et al. |

(Continued)

FOREIGN PATENT DOCUMENTS

| | | |
|---|---|---|
| CN | 1331891 A | 1/2002 |
| DE | 19915584 | 10/1999 |

(Continued)

OTHER PUBLICATIONS

International Search Report and Written Opinion—PCT/US2012/042758—ISA/EPO—Sep. 26, 2012.

(Continued)

*Primary Examiner* — Kiet Doan
(74) *Attorney, Agent, or Firm* — Patterson & Sheridan, L.L.P.

(57) ABSTRACT

Certain aspects of the disclosure relate generally to search of radio access technologies (RAT). For example, certain aspects of the present disclosure relate to a technique for facilitating higher priority radio access technology (RAT) search and cell reselection in areas having a plurality of overlapping RATs, such as GSM and LTE. According to certain aspects, a user equipment (UE) may generate a local set of cell reselection parameters based on one or more default cell reselection parameters and/or stored system information received during previous connects with found cells. According to certain aspects, the UE may perform cell reselection based on the local set of cell reselection parameters.

22 Claims, 5 Drawing Sheets

(56) References Cited

U.S. PATENT DOCUMENTS

| | | | |
|---|---|---|---|
| 6,747,965 | B1 | 6/2004 | Nara et al. |
| 6,765,891 | B2 | 7/2004 | Laitinen et al. |
| 7,062,271 | B2 | 6/2006 | Choi |
| 7,373,148 | B2 | 5/2008 | Kim et al. |
| 2002/0052201 | A1 | 5/2002 | Wilhelmsson et al. |
| 2003/0040311 | A1 | 2/2003 | Choi |
| 2003/0203735 | A1 | 10/2003 | Andrus et al. |
| 2004/0043798 | A1 | 3/2004 | Amerga et al. |
| 2004/0109431 | A1 | 6/2004 | Abrahamson et al. |
| 2004/0190471 | A1 | 9/2004 | Bender et al. |
| 2004/0192287 | A1 | 9/2004 | Namiki et al. |
| 2005/0245260 | A1 | 11/2005 | Nielsen et al. |
| 2006/0166694 | A1* | 7/2006 | Jeong et al. ............... 455/525 |
| 2006/0178153 | A1 | 8/2006 | Tenny et al. |
| 2006/0258386 | A1* | 11/2006 | Jeong et al. ............... 455/525 |
| 2007/0004445 | A1 | 1/2007 | Dorsey et al. |
| 2007/0037577 | A1 | 2/2007 | Dalsgaard et al. |
| 2007/0223510 | A1 | 9/2007 | Joo |
| 2009/0034452 | A1 | 2/2009 | Somasundaram et al. |
| 2009/0047954 | A1 | 2/2009 | Tenny et al. |
| 2009/0088160 | A1* | 4/2009 | Pani et al. ............... 455/436 |
| 2009/0247167 | A1 | 10/2009 | Higashide |
| 2009/0264133 | A1 | 10/2009 | Lee et al. |
| 2010/0184429 | A1* | 7/2010 | Tod et al. ............... 455/434 |
| 2010/0304749 | A1* | 12/2010 | Dwyer et al. ............... 455/443 |
| 2010/0317349 | A1 | 12/2010 | Serravalle |
| 2011/0064059 | A1* | 3/2011 | Hooli et al. ............... 370/332 |
| 2011/0110327 | A1 | 5/2011 | Ramachandran et al. |
| 2011/0171926 | A1* | 7/2011 | Faccin et al. ............... 455/404.1 |
| 2011/0176424 | A1* | 7/2011 | Yang et al. ............... 370/236.2 |
| 2011/0216732 | A1* | 9/2011 | Maeda et al. ............... 370/329 |
| 2012/0322446 | A1 | 12/2012 | Ramachandran et al. |

FOREIGN PATENT DOCUMENTS

| | | |
|---|---|---|
| EP | 1503608 | 2/2005 |
| EP | 2146540 A1 | 1/2010 |
| EP | 2249607 A1 | 11/2010 |
| JP | 60077259 | 5/1985 |
| JP | 05075530 | 3/1993 |
| JP | 05244075 | 9/1993 |
| JP | 10322760 | 12/1998 |
| JP | 2000175243 | 6/2000 |
| JP | 2004312721 A | 11/2004 |
| JP | 2004356684 A | 12/2004 |
| JP | 2006060295 A | 3/2006 |
| JP | 2008502253 A | 1/2008 |
| JP | 2010187422 A | 8/2010 |
| JP | 2012526407 A | 10/2012 |
| KR | 20060114947 A | 11/2006 |
| KR | 20070069930 A | 7/2007 |
| WO | 0022853 A1 | 4/2000 |
| WO | 0158054 A1 | 8/2001 |
| WO | 0195504 A2 | 12/2001 |
| WO | WO-03084095 | 10/2003 |
| WO | 2005122621 A1 | 12/2005 |
| WO | 2007086679 A1 | 8/2007 |
| WO | WO2007113457 A1 | 10/2007 |
| WO | 2008099341 A2 | 8/2008 |
| WO | WO2008157713 | 12/2008 |
| WO | WO2009007720 | 1/2009 |
| WO | WO2009020874 | 2/2009 |
| WO | WO-2010127435 A1 | 11/2010 |
| WO | WO-2011024310 A1 | 3/2011 |

OTHER PUBLICATIONS

3GPP TS 23.122 V10.3.0 (Mar. 2011), 3rd Generation Partnership Project; Technical Specification Group Core Network and Terminals; Non-Access-Stratum (NAS) functions related to Mobile Station (MS) in idle mode (Release 10), 43 pages.

3GPP TS 36.304 V10.1.0 (Mar. 2011) 3rd Generation Partnership Project; Technical Specification Group Radio Access Network; Evolved Universal Terrestrial Radio Access (E-UTRA); User Equipment (UE) procedures in idle mode (Release 10), 33 pages.

3GPP TS 36.331 V10.1.0 (Mar. 2011) 3rd Generation Partnership Project; Technical Specification Group Radio Access Network; Evolved Universal Terrestrial Radio Access (E-UTRA); Radio Resource Control (RRC); Protocol specification (Release 10), 290 pages.

3GPP TS 44.018, "Mobile radio interface layer 3 specification; Radio Resource Control (RRC) protocol", V9.8.0, Release 9, Mar. 2011, pp. 1-431.

3GPP TS 45.008 V10.0.0 (Mar. 2011) 3rd Generation Partnership Project; Technical Specification Group GSM/EDGE Radio Access Network; Radio subsystem link control (Release 10), 148 pages.

3GPP TS 25.304 V4.0.0 (Mar. 2001) 3rd Generation Partnership Project: Technical Specification Group Radio Access Network; UE prodecures in Idle Mode and Procedures for Cell Reselection in Connected Mode (Release 4) Mar. 27, 2001.

3GPP TS 25.304 V6.4.0 (Dec. 2004) 3rd Generation Partnership Project: Technical Specification Group Radio Access Network; UE prodecures in Idle Mode and Procedures for Cell Reselection in Connected Mode (Release 6) Dec. 31, 2004.

3rd Generation Partnership Project "UE Procedures in Idle Mode and Procedures for Cell Reselection in Connected Mode (Release 4)", Jun. 2002.

Digital cellular telecommunications system (Phase 2); Mobile radio interface layer 3 specification; Radio Resource Control (RRC) protocol (3GPP TS 44.018 version 10.2.0 Release 10), Technical specification, European telecommunications standards institute (Etsi), 650, route des lucioles;F-06921 sophia-antipolis; France, vol. 3gpp Geran 2, No. V10.2.0, Mar. 1, 2011, XP014065422.

Ericsson: "Ericsson comments on NSP problems", 3GPP Draft; NSW-060015-Ericsson-NSP-Comments, 3rd Generation Partnership Project (3GPP), Mobile Competence Centre ; 650, Route Des Lucioles ; F-06921 Sophia-Antipolis Cedex ; France, no. Amsterdam, Netherlands; 20060124-20060125, Jan. 18, 2006, XP050647762, [retrieved on Jan. 18, 2006].

Nokia Siemens Networks et al: "1 Introduction 2 Operation in a multi-RAT scenario", 3GPP Draft; GP-071684 Interworking Priorities, 3rd Generation Partnership Project (3GPP), Mobile Competence Centre; 650, Route Des Lucioles; F-06921 Sophia-Antipolis Cedex; France, vol. TSG GERAN, no. Vancouver, Canada; 20071112-20071116, Nov. 7, 2007, XP050594012, [retrieved on Nov. 7, 2007].

Tamea, et al., "A Probability based Vertical Handover Approach to Prevent Ping-Pong Effect," 2009 6th International Symposium on Wireless Communication Systems (ISWCS 2009), Sep. 7-10, 2009, Tuscany, IEEE, pp. 181-185.

* cited by examiner

METHODS AND APPARATUS FOR INTER-RAT CELL RESELECTION

CLAIM OF PRIORITY UNDER 35 U.S.C. §119

The present Application for Patent claims priority to U.S. Provisional Application No. 61/498,471 entitled, "METHODS AND APPARATUS FOR INTER-RAT CELL RESELECTION," filed Jun. 17, 2011, and assigned to the assignee hereof and hereby expressly incorporated by reference herein.

FIELD

Certain aspects of the disclosure relate generally to wireless communications systems and, more particularly, to methods and apparatus for cell reselection between different radio access technologies (RATs) (e.g., for facilitating inter-RAT cell reselection in legacy networks).

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-single-out (MISO) or a multiple-in-multiple-out (MIMO) system.

Additionally, a wireless communication system may include multiple cells supporting a variety of radio access technologies (RAT). As infrastructure is added to the wireless communication system to support a new RAT, interoperability issues between older RAT and newer RAT may arise. As such, there is a need for techniques and apparatus for managing transitions between cells utilizing different RATs.

SUMMARY

Certain aspects of the present disclosure provide a method for wireless communications. The method generally includes generating a local set of cell reselection parameters based on one or more default cell reselection parameters and performing cell reselection from a first cell utilizing a first radio access technology (RAT) to a second cell utilizing a second RAT based on the local set of cell reselection parameters.

Certain aspects of the present disclosure provide an apparatus for wireless communications. The apparatus generally includes means for generating a local set of cell reselection parameters based on one or more default cell reselection parameters and means for performing cell reselection from a first cell utilizing a first radio access technology (RAT) to a second cell utilizing a second RAT based on the local set of cell reselection parameters.

Certain aspects of the present disclosure provide an apparatus for wireless communications. The apparatus generally includes at least one processor configured to generate a local set of cell reselection parameters based on one or more default cell reselection parameters and perform cell reselection from a first cell utilizing a first radio access technology (RAT) to a second cell utilizing a second RAT based on the local set of cell reselection parameters and a memory coupled with the at least one parameter.

Certain aspects of the present disclosure provide a computer program product comprising a computer readable medium having instructions stored thereon. The instructions are generally executable by one or more processors for generating a local set of cell reselection parameters based on one or more default cell reselection parameters and performing cell reselection from a first cell utilizing a first radio access technology (RAT) to a second cell utilizing a second RAT based on the local set of cell reselection parameters.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
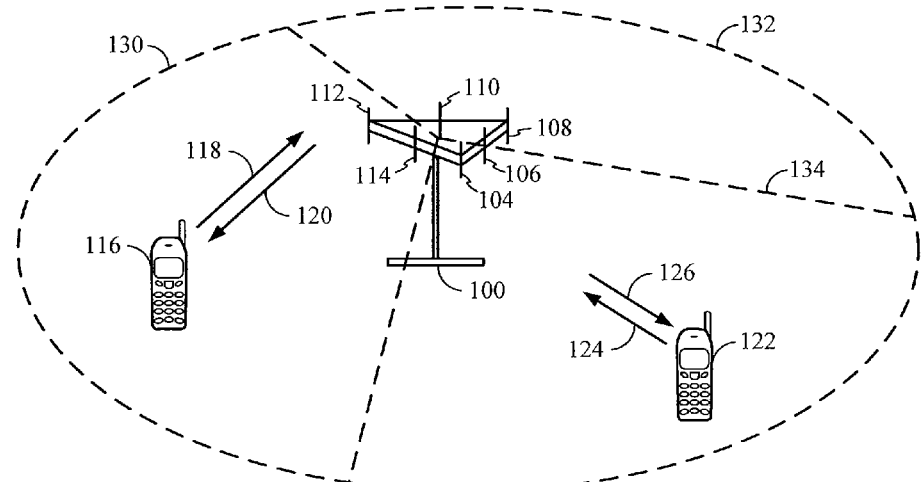
FIG. 1 illustrates a multiple access wireless communication system.

A wireless multiple-access communication system may support multiple radio access technologies (RAT). Examples of RATs include, e.g., Universal Mobile Telecommunications System (UMTS), Global System for Mobile Communications (GSM), cdma2000, WiMAX, WLAN (e.g., WiFi), Bluetooth, Long Term Evolution (LTE), LTE-Advanced, and the like. As newer RATs are released, infrastructure of the wireless communication system may be augmented to support the newer RATs and protocols. Additionally, the existing infrastructure of the wireless communication system may be updated to support interoperability between legacy RATs and current RATs (e.g., between GSM and LTE). However, in some cases, upgraded systems may overlap with non-upgraded system to create inoperability issues.

For example, LTE systems may overlap with old legacy GSM EDGE Radio Access Network (GERAN) deployments where operators may not have upgraded the existing infrastructure to support GSM-to-LTE inter-RAT transitions. In other words, the GERAN base stations in these legacy networks may not direct a user equipment (UE) to LTE service and may not broadcast LTE neighbors or cell reselection information in system broadcast channels, such as System Information 2 Quater (SI2Q) messages. However, in such areas, the LTE systems still support LTE-to-GSM inter-RAT mobility. Accordingly, in such networks, if the UE were to transition from LTE to GSM via a suitable mobility procedure, such as through cell reselection, redirection, cell change orders (CCOs), or out-of-service (OOS) mobility behavior, the UE may not return to LTE service unless the UE loses GSM coverage or is power cycled. Accordingly, there is a need for improved apparatus and techniques of managing inter-RAT transitions in areas lacking RAT interworking. According to certain aspects, methods and apparatus for facilitating inter-RAT cell reselection in legacy networks utilizing a local set of cell reselection parameters are provided.

For purposes of the detailed discussion below, a wireless communication system including user equipment supporting LTE and GSM are described, though the certain aspects provided below may be applied to other configurations of user equipment supporting various combinations of multiple RATs, including those listed above. Also, while certain aspects of the present disclosure generally refer to GSM as a legacy RAT having lower priority than LTE, it is understood that certain aspects may be extended to those cases where GSM may be given an equal or higher priority than LTE.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access schemes in 3GPP Long Term Evolution (LTE), or Evolved UTRA, and/or LTE Advanced.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an wireless terminal, a user terminal, a user agent, a user device, user equipment ("UE"), a user station, a subscriber station, a subscriber unit, a mobile station, a remote station, a remote terminal, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects described herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) includes multiple antenna groups, one including antennas 104 and 106, another including antennas 108 and 110, and yet another including antennas 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In the aspect shown in FIG. 1, each antenna group is designed to communicate to access terminals in one sector of the areas covered by access point 100. FIG. 1 shows that the coverage area of the access point 100 is partitioned into three sectors 130, 132, and 134. Access terminal 116 is in communication with the sector 130 of access point 100, and access terminal 122 is in communication with the sector 134. Sector 132 is a non-serving sector in the aspect shown in FIG. 1.

In communication over forward links 120 and 126, the transmitting antennas of access point 100 utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
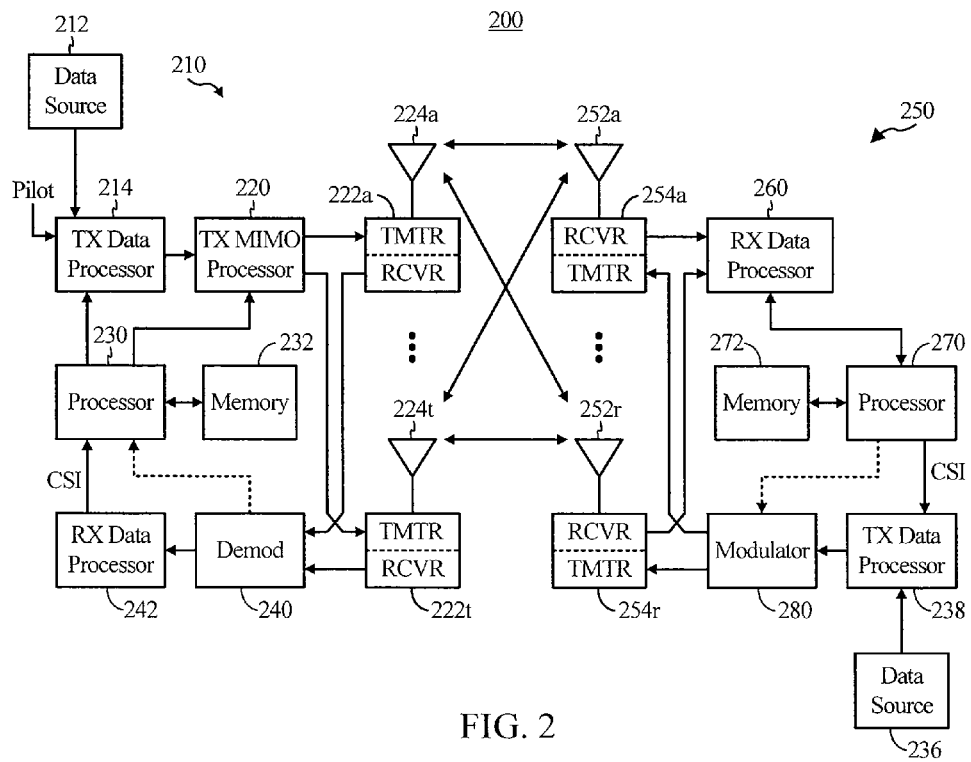
FIG. 2 is a block diagram of a communication system.

FIG. 2 is a block diagram of an aspect of a transmitter system 210 (also known as the access point) and a receiver system 250 (also known as the access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

According to certain aspects, the receiver system 250 may be configured to support a plurality of RATs. According to certain aspects, the receiver system 250 may be configured to support a first RAT comprising GSM and a second RAT comprising LTE. According to certain aspects, various components of the receiver system 250, such as the processor 270 and TX data processor 238, may be configured to implement techniques for performing cell reselection between GSM and LTE cells based on a local set of cell reselection parameters as described herein. According to certain aspects, the processor 270 may be configured to generate a local set of cell reselection parameters based on one or more default cell reselection parameters. According to certain aspects, the processor 270 may be configured to perform a cell reselection procedure to switch from a GSM cell to an LTE cell based on the local set of cell reselection parameters.

It is generally understood that logical channels are classified into Control Channels and Traffic Channels. Logical Control Channels comprise a Broadcast Control Channel (BCCH) which is a DL channel for broadcasting system control information, a Paging Control Channel (PCCH) which is a DL channel that transfers paging information, and a Multicast Control Channel (MCCH) which is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information and used by UEs having an RRC connection. In an aspect, Logical Traffic Channels comprise a Dedicated Traffic Channel (DTCH) which is a point-to-point bi-directional channel, dedicated to one UE, for the transfer of user information. Also, a Multicast Traffic Channel (MTCH) is a point-to-multipoint DL channel for transmitting traffic data.

It is further understood that Transport Channels are classified into DL and UL. DL Transport Channels comprise a Broadcast Channel (BCH), a Downlink Shared Data Channel (DL-SDCH) and a Paging Channel (PCH), the PCH for support of UE power saving (Discontinuous Reception (DRX) cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)

DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

For the purposes of the present document, the following abbreviations apply:
ACK Acknowledgement
AM Acknowledged Mode
AMD Acknowledged Mode Data
ARQ Automatic Repeat Request
BCCH Broadcast Control CHannel
BCH Broadcast CHannel
BW Bandwidth
C- Control-
CB Contention-Based
CCE Control Channel Element
CCCH Common Control CHannel
CCH Control CHannel
CCTrCH Coded Composite Transport Channel
CDM Code Division Multiplexing
CF Contention-Free
CP Cyclic Prefix
CQI Channel Quality Indicator
CRC Cyclic Redundancy Check
CRS Common Reference Signal
CTCH Common Traffic CHannel
DCCH Dedicated Control CHannel
DCH Dedicated CHannel
DCI Downlink Control Information
DL DownLink
DRS Dedicated Reference Signal
DSCH Downlink Shared Channel
DSP Digital Signal Processor
DTCH Dedicated Traffic CHannel
E-CID Enhanced Cell IDentification
EPS Evolved Packet System
FACH Forward link Access CHannel
FDD Frequency Division Duplex
FDM Frequency Division Multiplexing
FSTD Frequency Switched Transmit Diversity
HARQ Hybrid Automatic Repeat/request
HW Hardware
IC Interference Cancellation
L1 Layer 1 (physical layer)
L2 Layer 2 (data link layer)
L3 Layer 3 (network layer)
LI Length Indicator
LLR Log-Likelihood Ratio
LSB Least Significant Bit
MAC Medium Access Control
MBMS Multimedia Broadcast Multicast Service
MCCH MBMS point-to-multipoint Control Channel
MMSE Minimum Mean Squared Error
MRW Move Receiving Window
MSB Most Significant Bit
MSCH MBMS point-to-multipoint Scheduling CHannel
MTCH MBMS point-to-multipoint Traffic CHannel
NACK Non-Acknowledgement
PA Power Amplifier
PBCH Physical Broadcast CHannel
PCCH Paging Control CHannel
PCH Paging CHannel
PCI Physical Cell Identifier
PDCCH Physical Downlink Control CHannel
PDU Protocol Data Unit
PHICH Physical HARQ Indicator CHannel
PHY PHYsical layer
PhyCH Physical CHannels
PMI Precoding Matrix Indicator
PRACH Physical Random Access Channel
PSS Primary Synchronization Signal
PUCCH Physical Uplink Control CHannel
PUSCH Physical Uplink Shared CHannel
QoS Quality of Service
RACH Random Access CHannel
RB Resource Block
RLC Radio Link Control
RRC Radio Resource Control
RE Resource Element
RI Rank Indicator
RNTI Radio Network Temporary Identifier
RS Reference Signal
RTT Round Trip Time
Rx Receive
SAP Service Access Point
SDU Service Data Unit
SFBC Space Frequency Block Code
SHCCH SHared channel Control CHannel
SNR Signal-to-Interference-and-Noise Ratio
SN Sequence Number
SR Scheduling Request
SRS Sounding Reference Signal
SSS Secondary Synchronization Signal
SU-MIMO Single User Multiple Input Multiple Output
SUFI SUper Field
SW Software
TA Timing Advance
TCH Traffic CHannel
TDD Time Division Duplex
TDM Time Division Multiplexing
TFI Transport Format Indicator
TPC Transmit Power Control
TTI Transmission Time Interval
Tx Transmit
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
VOIP Voice Over Internet Protocol
MBSFN multicast broadcast single frequency network
MCH multicast channel
DL-SCH downlink shared channel
PDCCH physical downlink control channel
PDSCH physical downlink shared channel Example Inter-Rat Cell Reselection As described above, certain networks (e.g., older "legacy" GSM networks) may not be configured to interoperate with other overlapping networks (e.g., LTE networks) and, as a result, may not advertise parameters used for cell reselection to the other overlapping networks. As an example, older "legacy GSM" networks may not advertise the existence of neighboring LTE cells to UEs camped on the GSM network as an updated GSM network would. As a results, if a UE were handed over from the LTE network to the GSM network, it might never come back (e.g., until the GSM network connection/coverage is lost).

According to certain aspects of the present disclosure, however, UEs may be configured to autonomously seek out LTE service, and if available, camp on LTE cells. For example, UEs may be configured to perform searches for LTE service on frequencies that are likely to be deployed in the neighborhood. According to certain aspects, methods and techniques are provided for constructing LTE neighbor lists by learning (e.g., dynamically) the presence of LTE neighbors and by configuring (e.g., dynamically) cell reselection-related parameters. In one implementation, mapping functions may be utilized to generate a simulated SI2Q message based on system information received, obtained, and/or collected from target RAT cells.

Figure 3:
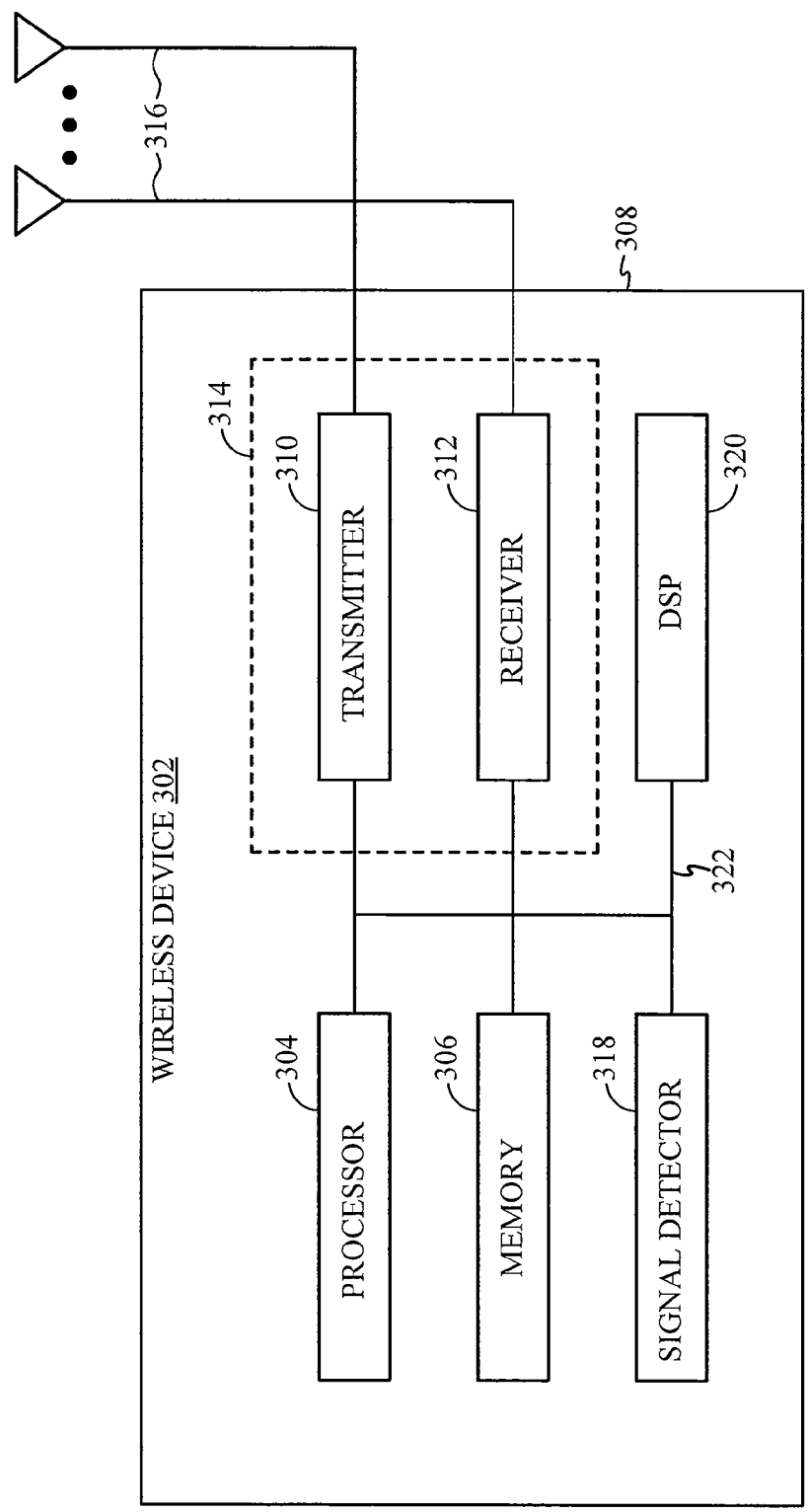
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. While the wireless device 302 may be a base station 100 or any of user terminals 116 and 122 of FIG. 1, the below detailed description may interchangeably refer to the wireless device 302 as a UE 302.

The wireless device 302 may include a processor 304 which controls operation of the wireless device 302. The processor 304 may also be referred to as a central processing unit (CPU). The various components of the wireless device 302 may be coupled together by a bus system 322, which may include a power bus, a control signal bus, and a status signal bus in addition to a data bus. Memory 306, which may include both read-only memory (ROM) and random access memory (RAM), provides instructions and data to the processor 304. A portion of the memory 306 may also include non-volatile random access memory (NVRAM). However, additional and/or other memories may be employed. For example, memory 306 (as with all data stores disclosed herein) can be either volatile memory or nonvolatile memory or can include both volatile and nonvolatile portions, and can be fixed, removable or include both fixed and removable portions. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink™ DRAM (SLDRAM), and direct Rambus™ RAM (DRRAM). The processor 304 typically performs logical and arithmetic operations based on program instructions stored within the memory 306. The instructions in the memory 306 may be executable to implement the methods described herein.

According to certain aspects, the memory 306 may be configured to store system information received, obtained, and/or collected from RAT cells according to techniques described further below. In one implementation, the memory 306 may include a local cache configured to store System Information Blocks (SIBs) received while camped on LTE cells. According to certain aspects, the stored system information may include cell reselection parameters that may be utilized as described below.

According to certain aspects, the memory 306 may be configured to store a local set of cell reselection parameters. The local set of cell reselection parameters may be updated in memory 306 according to techniques described further below. According to certain aspects, the local set of cell reselection parameters may comprise a pre-provisioned minimum set of inter-RAT cell reselection parameters, sometimes referred to as a "default parameter set".

The default parameter set may be provided by a physical land mobile networks (PLMN), operator, or wireless device manufacturer, or may be loaded via a wireless device configuration. According to an alternative aspect, rather than being pre-loaded, the default cell reselection parameters may instead be obtained from one or more SIBs received in previous connections with another cell. In one implementation, the default parameter set may be formatted as a default SI2Q message. In some aspects, the default parameter set may be (e.g., initially be) a "null set".

According to certain aspects, the default parameter set stored in memory 306 includes at least a list of known LTE channel frequencies, such as an E-UTRA Absolutely Radio Frequency Channel Number (EARFCNs) signifying an LTE channel; a LTE RAT priority parameter that may be applied to all LTE EARFCNs; a GERAN RAT priority parameter; and a $Thresh_{E-UTRAN\_High}$ parameter indicating a signal threshold that must be exceeded by the received signal strength of a higher priority LTE neighbor cell for the cell to be considered a candidate for cell reselection.

According to certain aspects, a list of LTE EARFCNs may be provided by a network operator, the LTE RAT priority parameter may be set to a highest priority, the GERAN RAT priority parameter may be set to a lowest priority, and the $Thresh_{E-UTRAN\_High}$ parameter may be set to a reasonable default value for signal strength. However, the default parameter set may include a larger number of, smaller number of, and/or different parameters. It is contemplated that the default parameter set may include additional default reselection parameters corresponding to local reselection parameters described below.

Additionally, according to certain aspects, the memory 306 may be further configured to store a pre-provisioned list of PLMNs where a legacy network may not broadcast interoperable messages advertising neighboring RATs. In one implementation, the memory 306 may store a pre-provisioned list of PLMNs that have been pre-determined to include GSM base stations that may not broadcast SI2Q messages and where local generation of GSM-to-LTE cell reselection parameters may be desired.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and/or quantify the level of signals received by the transceiver 314. The signal detector 318 may detect such signals as total energy, energy per subcarrier per symbol, power spectral density and/or other signals. The wireless device 302 may also include a digital signal processor (DSP) 320 for use in processing signals.

According to certain aspects, the signal detector 318 of the UE 302 may be configured to attempt to acquire LTE service. According to certain aspects, the processor 304 and/or DSP 320 may be configured to collect system information from neighboring LTE cells. According to certain aspects, the processor 304 may be configured to access the default parameter set stored in memory 306 and generate a local set of cell reselection parameters based on the default parameter set. According to certain aspects, the processor 304 may be configured to perform cell reselection from a GSM cell to a LTE cell based on the local set of cell reselection parameters.

Figure 4:
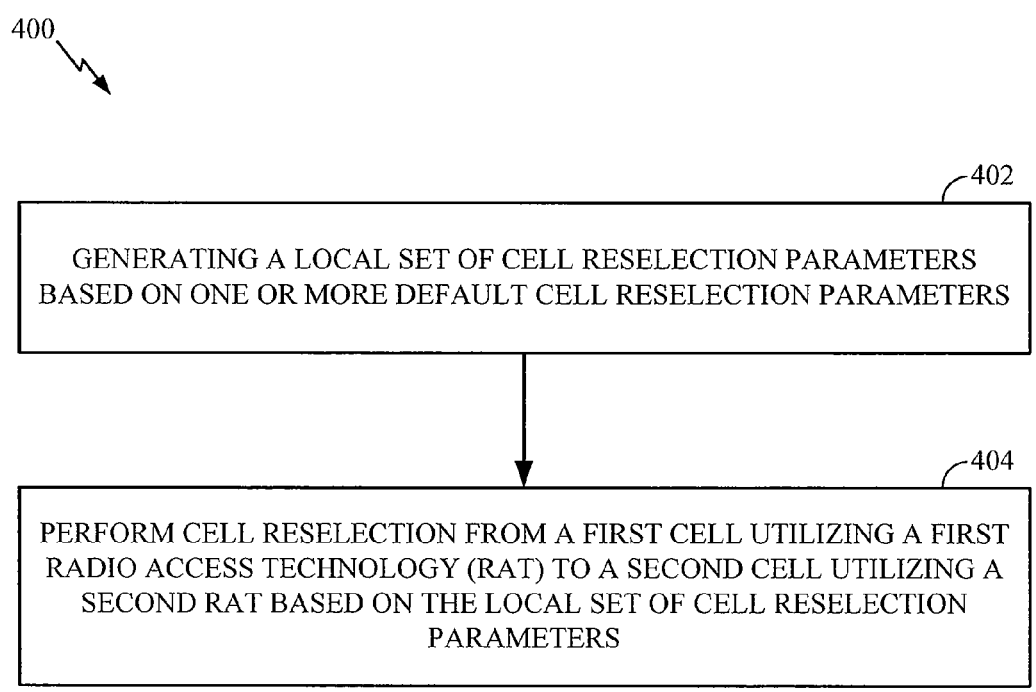
FIG. 4 illustrates an example operation that may be performed by a wireless device in accordance with certain aspects of the present disclosure.

FIG. 4 illustrates an example operation 400 that may be performed, for example, by a user equipment (UE) for facilitating inter-RAT cell reselection from a first cell to a second cell in accordance with aspects of the present disclosure.

The operation 400 may begin at 402 where the UE generates a local set of cell reselection parameters based on one or more default cell reselection parameters. According to certain aspects, the UE may process (e.g., transform) one or more the default cell reselection parameters utilizing, for example, by employing at least one mapping function, described further with FIG. 6 below, to generate the local set of cell reselection parameters. According to certain aspects, the local set of cell reselection parameters comprises one or more parameters of a SI2Q message.

At 404, the UE performs a cell reselection from the first cell utilizing a first RAT to the second cell utilizing a second RAT based on the local set of cell reselection parameters generated at 402. According to certain aspects, the first RAT comprises GSM and the second RAT comprises LTE. According to certain aspects, the UE may update one or more of the default cell reselection parameters based on cached system information obtained, received, and/or collected during previous connections of the second RAT. According to certain aspects, the cached system information comprises cell reselection parameters from one or more SIBs obtained, received, and/or collected in previous connections with the second cell.

According to certain aspects, the UE may update the local set of cell reselection parameters based on the recent transition history. In one aspect, the UE may detect repeated transitions between the first cell and second cell representing a ping-pong network condition. The UE may then update the local set of cell reselection parameters to reduce the number of cell transitions between the first and second cells. According to certain aspects, the UE may restore a parameter of the updated local set of cell reselection parameters to an original value. According to certain aspects, the UE may unsuccessfully transition from the first cell to the second cell and update the local set of cell reselection parameters to reduce the number of cell transition attempts between the first and second cells.

According to certain aspects, prior to performing the step at 402, the UE may first determine that the first cell does not support transitions from the first cell utilizing the first RAT to cells utilizing the second RAT (e.g., the first cell may not advertise neighboring LTE cells). The UE may determine the first cell does not support the inter-RAT transitions based on receiving a signal (e.g., comprising a SI2Q message) from the first cell. The UE may also determine whether the first cell belongs to a PLMN where local generation of one or more cell reselection parameters is desired based on a pre-determined list of PLMNs.

Figure 5:
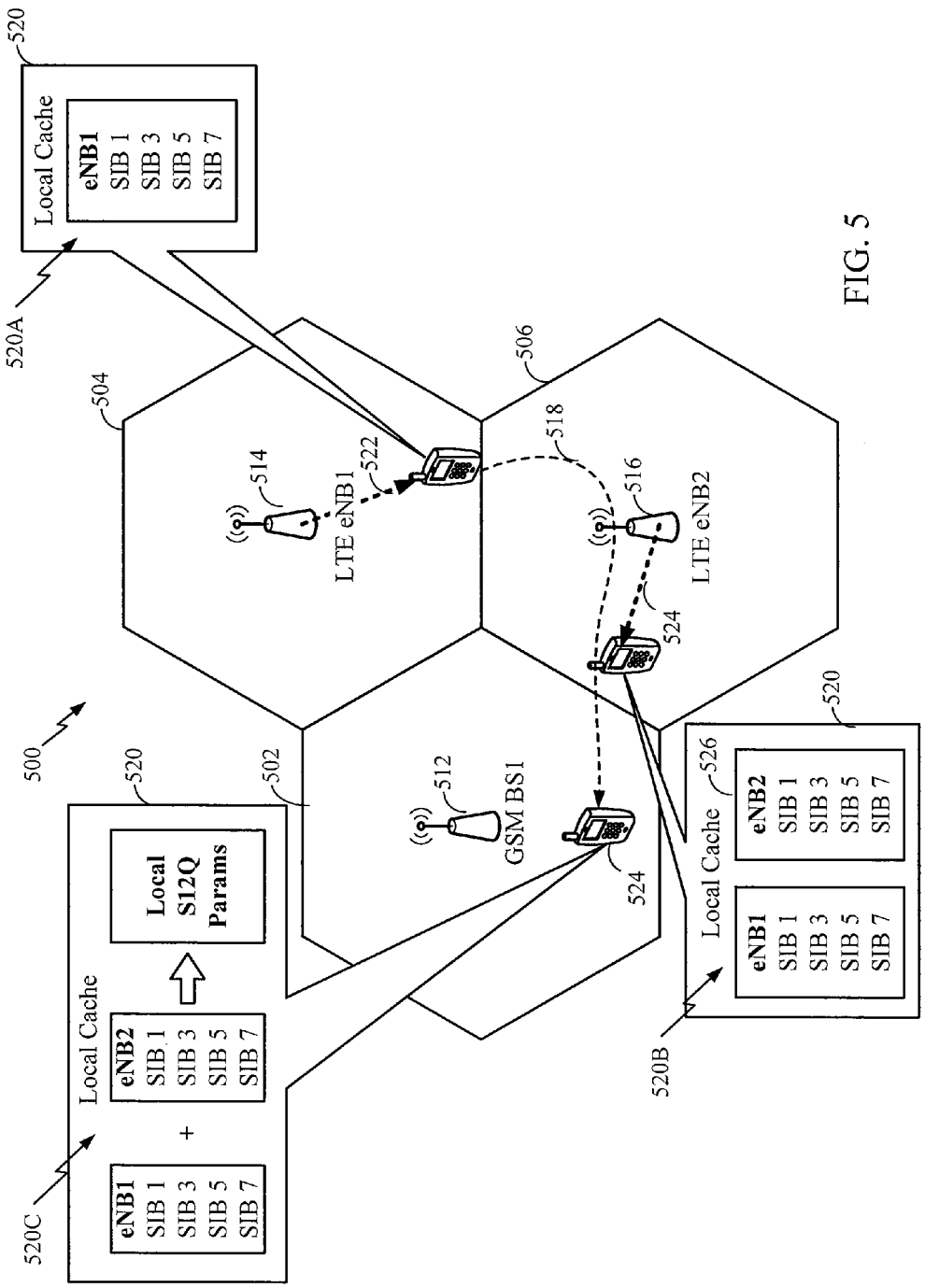
FIG. 5 illustrates an example multi-RAT topology, in accordance with certain aspects of the present disclosure.

FIG. 5 illustrates an example topology 500 of LTE coverage and GSM coverage in accordance with certain aspects of the present disclosure. As shown, the topology 500 includes a UE 510 camped to a GSM cell 502 established by a GSM base station ("GSM BS-1").

According to certain aspects, at certain times (e.g., when the UE 510 is powered up), the UE 510 may attempt to acquire LTE service. As shown, the UE 510 may discover neighboring LTE cells 504 and 506 established by the LTE eNodeBs 514 and 516 ("LTE eNB1" and "LTE eNB2").

When LTE service is found available, the UE 510 may camp on one or more of the LTE cells 504 and 506 using a cell selection procedure and obtain, receive, and/or collect one or more SIBs received while camping on the LTE cells 504 and 506. The UE 510 includes a local cache 520 configured to store the one or more SIBs obtained, received, and/or collected during connections with the LTE cells 504 and 506.

As described above, the UE 510 may cache system information comprising cell reselection parameters obtained, received, and/or collected from the one or more SIBs. For example, the UE 510 may obtain, receive, and/or collect a SIB Type 1 ("SIB1") message comprising at least one cell selection parameter (e.g., operator preferences for camping on the LTE cell, signal thresholds for camping on this LTE cell), a SIB Type 3 ("SIB3") message comprising at least one cell reselection parameter (e.g., such as cell reselection criteria), a SIB Type 5 ("SIB5") message comprising information on other RAT frequencies (e.g., LTE frequencies) that may be present or in a neighboring area (e.g., a list of other LTE frequencies), and/or a SIB Type 7 ("SIB7") message comprising at least one inter-RAT (e.g., LTE-to-GSM) cell reselection parameters (e.g., operator preferences for inter-RAT cell reselection).

According to certain aspects, the UE 510 may utilize the cached system information to update default cell reselection parameters, as described in greater detail below, with reference to FIG. 6.

According to certain aspects, upon transitioning to each LTE cell, as illustrated by the path of arrow 518, the UE may obtain, receive, and/or collect system information and may build up a cache of SIBs (or one or more parameters thereof) from each LTE cell. As shown, the UE 510 may camp on the LTE cell 504, as illustrated by arrow 522, and obtain, receive, and/or collect LTE SIBs including SIB1, SIB3, SIB5, and/or SIB7.

As shown, contents 520A of the local cache include the SIBs obtained, received, and/or collected thus far, namely the SIBs from LTE cell 504. As shown, the UE 510 may then transition and camp on the LTE cell 506, as illustrated by arrow 524, and obtain, receive, and/or collect LTE SIBs received from the LTE cell 506. Accordingly, the contents 520B of the local cache 520 may cumulatively include the SIBs obtained, received, and/or collected while the UE 510 was camped on the LTE cell 504 and those the SIBs obtained, received, and/or collected while camped on the LTE cell 506.

As shown, the UE 510 may then connect to the GSM base station 512 and camp on the GSM cell 502. According to certain aspects, the UE 510 may only perform an inter-RAT cell reselection based on the local set of cell reselection parameters while camped in cells that do not support interoperability/interworking with the higher priority RAT. According to certain aspects, the UE 510 may verify whether the serving GSM base station 512 belongs to a PLMN where local generation of inter-RAT (e.g., GSM-to-LTE) reselection parameters is desired based on a pre-determined list of PLMNs.

In one implementation, the UE 510 may access a pre-provisioned list of PLMNs stored in memory, such as the pre-provisioned list stored in memory 306 described above.

According to certain aspects, the UE 510 may verify whether the serving GSM base station 512 does not broadcast cell reselection parameters for neighboring LTE cells 504 and 506 (e.g., GSM-to-LTE cell reselection parameters.)

In one implementation, the absence of a SI2Q broadcast message may indicate to the UE 510 that the GSM cell 502 may not be capable of broadcasting this type of message and by inference that the GSM cell 502 may not be capable of broadcasting information regarding LTE service that may exist in the area. Conversely, the presence of a SI2Q broadcast message which omits any LTE neighbors may indicate to the UE 510 that the GSM base station 512 is capable of broadcasting this type of message and that there truly may not be any LTE service in the area. The presence of the SI2Q message including cell information of LTE neighbors may also indicate that the UE 510 may utilize standards-based GSM-to-LTE reselection procedures instead of the cell reselection procedure based on a local set of reselection parameters described herein.

According to certain aspects, upon determining that the serving GSM base station 512 does not broadcast LTE neighbors and determining that the UE 510 may locally generate GSM-to-LTE reselection parameters to facilitate inter-RAT cell reselection from the legacy GSM cell 502 to an LTE cell, the UE 510 may utilize local processes (e.g., transformations) to generate a local set of cell reselection parameters based on the system information obtained, received, and/or collected on previous visits to the LTE cells 504 and 506. (Local transformations according to certain aspects of the present disclosure are described in detail with FIG. 6.) Although the system information comprising cell reselection parameters obtained, received, and/or collected from the one or more SIBs and the generated local set of cell reselection parameters are shown stored in a local cache, the system information and/or generated local set of cell reselection parameters may be stored in a different type of memory.

In the example shown in FIG. 5, the UE 510 utilizes contents 520C of the local cache 520 (e.g., the SIBs obtained, received, and/or collected from LTE cells 504 and 506) to generate a "simulated" SI2Q message 526 comprising a local set of cell reselection parameters. Thereafter, the UE 510 may evaluate GSM-to-LTE cell reselection using the generated local set of cell reselection parameters.

Figure 6:
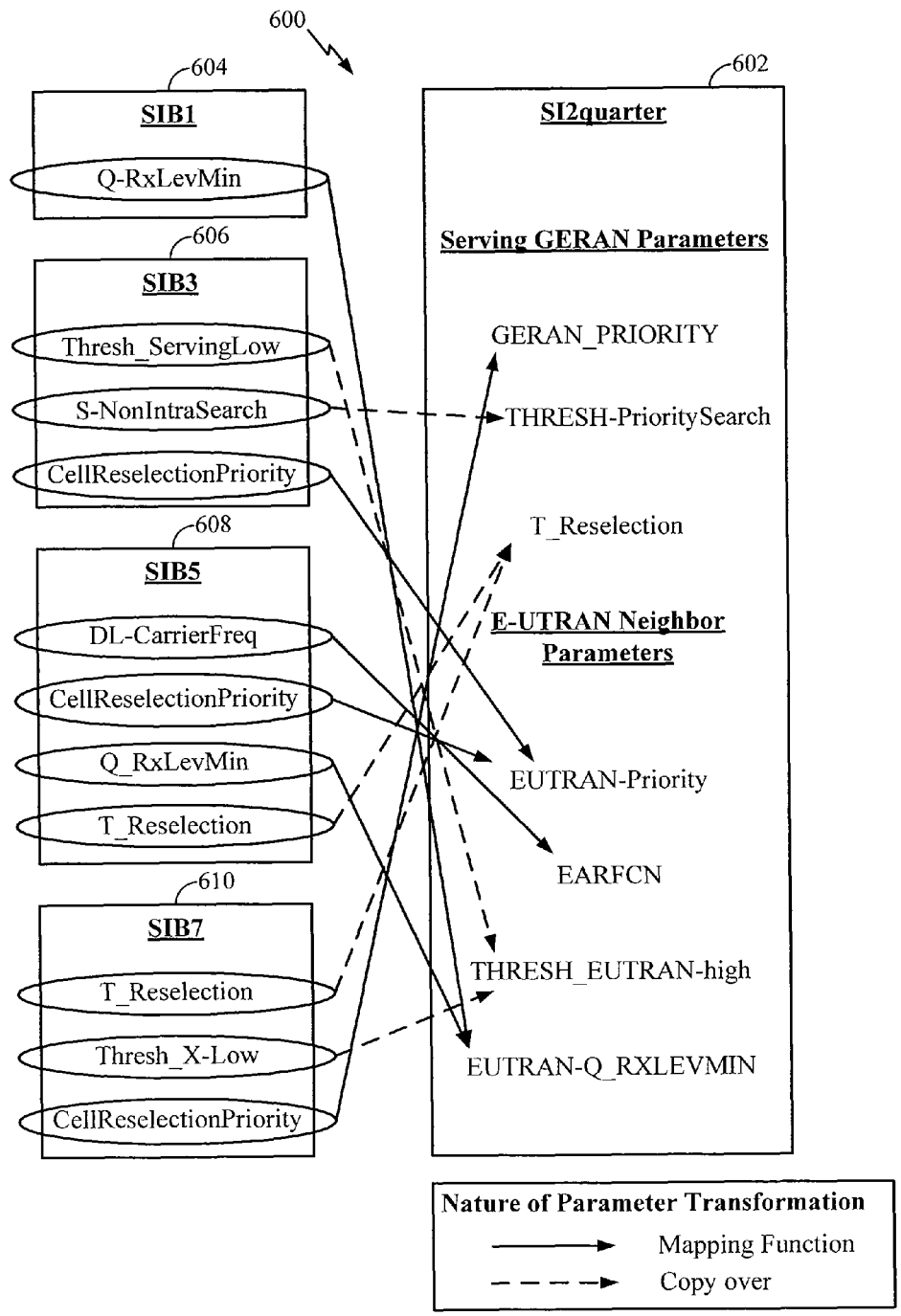
FIG. 6 illustrates an example of generating a local set of cell reselection parameters, in accordance with certain aspects of the present disclosure.

FIG. 6 illustrates an example 600 of generating a local set of cell reselection parameters in accordance with certain aspects of the present disclosure. According to certain aspects, the UE may transform the default parameter set, described above, utilizing at least one mapping function to generate the local set of cell reselection parameters, sometimes referred to as a "learnt parameter set".

In the example shown in FIG. 6, a local set of cell reselection parameters may comprise a GSM SI2Q message 602 generated by applying one or more transformations to parameters stored in cached system information, depicted as SIBs 604, 606, 608, and 610. According to certain aspects, the UE may generate a different local set of cell reselection parameters for each cell being evaluated by the cell reselection procedure. According to certain aspects, the transformations 600 may comprise a mapping function having one or more input parameters, a copy-over function, or some combination thereof. Other processing may be employed to form the local set of cell reselection parameters from the cached system information and/or the default parameter set.

According to certain aspects, the UE may modify the default parameter set using one or more parameters from the cached system information to generate a corresponding local cell reselection parameter 602. As described above, the default parameter set may include, but is not limited to, a list of LTE EARFCNs, an LTE RAT priority, a GERAN RAT priority, $\text{Thresh}_{PrioritySearch}$, $T_{Reselection}$, E-UTRAN $Q_{RxLevMin}$, and $\text{Thresh}_{E-UTRAN-High}$. According to certain aspects, the local set of cell reselection parameters 602 may comprise one or more serving RAT parameters (e.g., Serving GERAN Parameters) and/or one or more RAT neighbor parameters (e.g., E-UTRAN Neighbor Parameters).

According to certain aspects, the local set of cell reselection parameters 602 may comprise a serving RAT priority parameter (e.g., GERAN Priority) indicating an absolute priority of the serving RAT (e.g., GERAN). The priority may be indicative of the preference of the serving RAT with respect to other RATs in the network. According to certain aspects, the UE may modify the GERAN priority parameter in the default parameter set with a GERAN priority for the serving frequency derived from system information in local cache. As shown, the UE may map a Cell Reselection Priority from SIB7 610, indicating the priority of the corresponding neighbor GSM cell, to a corresponding local GERAN Priority parameter.

According to certain aspects, the local set of cell reselection parameters 602 may comprise a Threshold Priority Search parameter indicating a signal threshold that governs when the UE measures lower priority cells. According to certain aspects, if the serving RAT cell (e.g., GSM cell) is weaker than this threshold, the UE may measure lower priority inter-RAT cells. According to certain aspects, the UE may modify a Threshold Priority search parameter of the default parameter set as a function of a Non Intra Search Signal level parameter (e.g., $S_{NonIntraSearch}$) indicating a signal strength threshold that governs when the UE measures lower priority inter-RAT neighbors. In some aspects, if the serving LTE cell drops below this threshold value, the UE may measure lower priority inter-RAT neighbors. As shown, the UE may transform the $S_{NonIntraSearch}$ collected from SIB3 606 using one or more mapping functions to generate a corresponding local Threshold Priority Search parameter (e.g., $\text{Thresh}_{PrioritySearch}$).

According to certain aspects, the local set of cell reselection parameters 602 may comprise a Time Reselection (e.g., $T_{Reselection}$) parameter indicating a time duration for which a qualifying inter-RAT cell reselection target may continue to qualify to be a target such that cell reselection can be performed. The time reselection period is an observation period during which a suitable target must remain suitable. According to certain aspects, the UE may modify the Time Reselection parameter in the default parameter set as a function of the Time Reselection parameters collected from SIB5 and SIB7 in the local cache. The collected Time Reselection parameters indicate a time duration for which a qualifying inter-frequency LTE cell (for SIB5) or an inter-RAT LTE GSM cell (for SIB7) must continue to qualify to be a cell reselection target so that cell reselection can be performed. As shown, the UE may map the $T_{Reselection}$ values collected from SIB5 608 and SIB7 610 to generate a corresponding local Time Reselection parameter (e.g., $T_{Reselection}$).

According to certain aspects, the local set of cell reselection parameters 602 may comprise a neighbor RAT channel parameter (e.g., EARFCN) signifying a RAT channel (e.g., LTE channel). According to certain aspects, the UE may modify the list of LTE EARFCNs of the default parameter set with channel frequencies learnt from LTE cells camped on, as well as frequencies broadcast from LTE cells using SIB5. As shown, the UE may copy over or map a downlink carrier frequency parameter (e.g., DL-CarrierFreq) from the SIB5

608 indicating a downlink frequency of the corresponding LTE neighbor to the local EARFCN parameter.

According to certain aspects, the local set of cell reselection parameters 602 may include a neighbor RAT priority parameter (e.g., E-UTRAN Priority) comprising a number signifying the priority of the neighboring RAT (e.g., E-UTRAN RAT). According to certain aspects, the UE may modify each EARFCN's priority in the default parameter set based on RAT priority parameters derived from SIB3 and SBI5 stored in the local cache. As shown, the UE may map a Cell Reselection Priority from SIB3 606 indicating the priority of the serving LTE cell or a Cell Reselection Priority from SIB5 608 indicating the priority of the corresponding neighbor LTE to generate a corresponding local E-UTRAN Priority parameter.

According to certain aspects, the local set of cell reselection parameters 602 may comprise a RAT-High Threshold parameter (e.g., $Thresh_{E\text{-}UTRAN\text{-}HIGH}$) indicating a signal threshold that must be exceeded by the received signal strength of a higher priority LTE neighbor cell for it to be considered a candidate for cell reselection. According to certain aspects, the UE may modify the $Thresh_{E\text{-}UTRAN\text{-}High}$ parameter in the default parameter set as a function of Low Serving Threshold parameter (e.g., $Thresh_{ServingLow}$) collected from SIB3 and a Low RAT Threshold parameter (e.g., $Thresh_{X\text{-}Low}$) collected from SIB7. The $Thresh_{ServingLow}$ parameter indicates a signal strength threshold that the serving LTE signal cell must drop to (or below) for the UE to consider a lower priority RAT as a candidate for reselection. The $Thresh_{X\text{-}Low}$ parameter indicates a signal strength threshold that the signal strength of a lower priority inter RAT cell must exceed for the inter RAT cell to be considered a suitable cell reselection target. As shown, the UE may utilize a $Thresh_{ServingLow}$ from SIB3 606 and a $Thresh_{X\text{-}Low}$ from SIB7 910 as input parameters to a mapping function to generate a local $Thresh_{E\text{-}UTRAN\text{-}HIGH}$ parameter.

According to certain aspects, the local set of cell reselection parameters 602 may comprise a neighbor RAT Minimum Receive Signal Level parameter (e.g., $E\text{-}UTRAN\text{-}Q_{RxLevMin}$) indicating a minimum received signal strength required for an LTE cell to be considered suitable for camping by the UE. According to certain aspects, the UE may modify the $E\text{-}UTRAN\text{-}Q_{RxLevMin}$ parameter in the default parameter set as a function of the $Q_{RxLevMin}$ values collected from SIB1 and SIB5. The $Q_{RxLevMin}$ values determine the minimum signal strength at which the LTE cell (for SIB1) or the neighbor LTE cell (for SIB5) must be received by the UE so as to be considered suitable for camping. As shown, the UE may map the $Q_{RxLevMin}$ parameter from SIB1 604 and the $Q_{RxLevMin}$ parameter from SIB5 608 to generate a local $E\text{-}UTRAN\text{-}Q_{RxLevMin}$ reselection parameter.

Accordingly, after generating the learnt parameter set, the UE may evaluate an inter-RAT cell reselection (e.g., a GSM-to-LTE cell reselection) using the parameters in the learnt parameter set. In one implementation, the learnt parameter set may be formatted as a SI2Q message for processing by a Radio Resource management (RR) stack of the UE. According to certain aspects, other formats may be employed to evaluate cell reselection using the learnt parameter set.

It is contemplated that the techniques described herein may be extended to a variety of cases for generating a local set of reselection parameters for use in transitioning between different types of RATs. According to certain aspects, the UE may also update the default parameter set based on the cached system information. According to certain aspects, where no default parameter set has been provided to the UE, the UE may generate the local set of cell reselection parameters based solely or primarily on the cached system information. According to certain aspects, if the UE is unable to generate a learnt parameter set because of insufficient cached system information available in the local cache, then the UE may continue to utilize the default parameter set for inter-RAT cell reselection evaluation.

According to certain aspects, if after having started to apply the learnt or default Parameter Set, the UE detects a "ping-pong" network condition wherein the UE repeatedly transitions, or "ping-pongs", back and forth between the GERAN and the LTE cells, the UE may adjust the learnt and/or default parameter sets such as to reduce the number of cell transitions and alleviate the ping-pong condition. According to certain aspects, the UE may detect a ping-pong network condition if more than a certain number of back-to-back GSM-LTE transitions happen within a given time interval. According to certain aspects, the UE may adjust the learnt and/or default parameters sets to alleviate the ping-pong condition by raising the $EUTRA\text{-}Q_{RxLevMin}$ threshold parameter. According to certain aspects, the adjusted parameter set may valid for a certain time duration, after which the adjusted parameters are restored to the original parameter values of the learnt and/or default parameter set.

Certain aspects of the present disclosure provide methods and apparatuses for facilitating inter-RAT cell reselection for legacy networks. As described above, certain aspects of the present disclosure advantageously provide searches for and cell-reselection to LTE service over other known approaches. For example, other approaches may utilize exhaustive processing and scanning that may cause in a UE to miss pages or other service on GERAN. As such, certain aspects of the present disclosure provide timely search and cell reselection for LTE service.

Additionally, other approaches that utilize exhaustive processing and scanning may negatively impact battery life or standby time of UEs. Accordingly, certain aspects of the present disclosure advantageously perform searches and cell reselection to LTE service in a power efficient manner. For example, certain aspects of the present disclosure provide a mechanism for PLMN operators to indicate to UEs to not perform local generation of cell reselection parameters, for example, when in a particular remote geographical area, via pre-provisioned lists of public land mobile networks (PLMNs), thus saving a UE processing time and energy when in that remote geographical area.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for connecting, means for detecting, means for transitioning, and/or means for receiving may comprise a transmitter, such as the transmitter unit 254 of the receiver system 250 (e.g., the wireless terminal) shown in FIG. 2, or means for determining, means for generating, means for performing, means for updating, means for transforming, and/or means for modifying may comprise a processing system, which may include one or more processors, such as the processor 270 of the receiver system 250 illustrated in FIG. 2. These means may also comprise any suitable combination of the transmitters 310, the receiver 312, the signal detector 318, memory 306, and/or the DSP 320 of FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
generating a local set of cell reselection parameters by transforming one or more default cell reselection parameters utilizing at least one mapping function; and
performing cell reselection from a first cell utilizing a first radio access technology (RAT) to a second cell utilizing a second RAT based on the local set of cell reselection parameters;
wherein the default cell reselection parameters are obtained from one or more system information blocks (SIBs) received in previous connections with the second cell.

2. The method of claim 1, further comprising:
updating one or more of the default cell reselection parameters based on stored system information collected during previous connections of the second RAT.

3. The method of claim 2, wherein the stored system information comprises cell reselection parameters collected from one or more system information blocks (SIBs) received in previous connections with the second cell.

4. The method of claim 1, further comprising:
updating the local set of cell reselection parameters based on recent transition history.

5. The method of claim 1, further comprising:
detecting repeated transitions between the first cell and the second cell representing a ping-pong network condition; and
updating the local set of cell reselection parameters to reduce the number of transitions between the first and second cells.

6. The method of claim 5, further comprising:
restoring a parameter of the updated local set of cell reselection parameters to an original value.

7. The method of claim 1, further comprising:
determining the first cell belongs to a public land mobile network (PLMN) wherein local generation of cell reselection parameters is desired based on a pre-determined list of PLMNs; and
determining the first cell does not broadcast cell reselection parameters for the second cell.

8. The method of claim 1, further comprising:
unsuccessfully transitioning from the first cell to the second cell; and
updating the local set of cell reselection parameters to reduce a number of cell transition attempts between the first and second cells.

9. The method of claim 1, wherein the local set of cell reselection parameters comprises one or more parameters of a System Information 2 Quater (SI2Q) message.

10. The method of claim 1, wherein the first RAT comprises Global System for Wireless Communications (GSM), and wherein the second RAT comprises Long Term Evolution (LTE).

11. An apparatus for wireless communications, comprising:
means for generating a local set of cell reselection parameters by transforming one or more default cell reselection parameters utilizing at least one mapping function; and
means for performing cell reselection from a first cell utilizing a first radio access technology (RAT) to a second cell utilizing a second RAT based on the local set of cell reselection parameters;
wherein the default cell reselection parameters are obtained from one or more system information blocks (SIBs) received in previous connections with the second cell.

12. The apparatus of claim 11, further comprising:
means for updating one or more of the default cell reselection parameters based on stored system information collected during previous connections of the second RAT.

13. The apparatus of claim 12, wherein the stored system information comprises cell reselection parameters collected from one or more system information blocks (SIBs) received in previous connections with the second cell.

14. The apparatus of claim 11, further comprising:
means for updating the local set of cell reselection parameters based on recent transition history.

15. The apparatus of claim 11, further comprising:
means for detecting repeated transitions between the first cell and the second cell representing a ping-pong network condition; and
means for updating the local set of cell reselection parameters to reduce the number of transitions between the first and second cells.

16. The apparatus of claim 15, further comprising:
means for restoring a parameter of the updated local set of cell reselection parameters to an original value.

17. The apparatus of claim 11, further comprising:
means for determining the first cell belongs to a public land mobile network (PLMN) wherein local generation of cell reselection parameters is desired based on a predetermined list of PLMNs; and
means for determining the first cell does not broadcast cell reselection parameters for the second cell.

18. The apparatus of claim 11, further comprising:
means for updating the local set of cell reselection parameters to reduce a number of cell transition attempts between the first and second cells.

19. The apparatus of claim 11, wherein the local set of cell reselection parameters comprises one or more parameters of a System Information 2 Quater (SI2Q) message.

20. The apparatus of claim 11, wherein the first RAT comprises Global System for Wireless Communications (GSM), and wherein the second RAT comprises Long Term Evolution (LTE).

21. An apparatus for wireless communications, comprising:
at least one processor configured to generate a local set of cell reselection parameters by transforming one or more default cell reselection parameters utilizing at least one mapping function and perform cell reselection from a first cell utilizing a first radio access technology (RAT) to a second cell utilizing a second RAT based on the local set of cell reselection parameters; and
a memory coupled with the at least one processor;
wherein the default cell reselection parameters are obtained from one or more system information blocks (SIBs) received in previous connections with the second cell.

22. A computer program product comprising a non-transitory computer readable medium having instructions stored thereon, the instructions executable by one or more processors for:
generating a local set of cell reselection parameters based on one or more default cell reselection parameters; and
performing cell reselection from a first cell utilizing a first radio access technology (RAT) to a second cell utilizing a second RAT based on the local set of cell reselection parameters;
wherein the default cell reselection parameters are obtained from one or more system information blocks (SIBs) received in previous connections with the second cell.

* * * * *